United States Patent [19]

Masse

[11] 4,252,030
[45] Feb. 24, 1981

[54] FORCE CONVERTER

[76] Inventor: Roger Masse, 340 Washington St., Tappan, N.Y. 10983

[21] Appl. No.: 924,613

[22] Filed: Jul. 14, 1978

[51] Int. Cl.³ ............................................. F16H 21/44
[52] U.S. Cl. ........................................... 74/110; 74/97
[58] Field of Search .................. 74/97, 100 R, 100 P, 74/110; 200/67 R (U.S. only)

[56] References Cited

U.S. PATENT DOCUMENTS

| 2,394,747 | 2/1946 | Campbell | 74/97 X |
| 2,667,546 | 1/1954 | Brady | 74/100 R X |
| 3,571,540 | 3/1971 | Richards | 74/100 P X |

*Primary Examiner*—Wm. Carter Reynolds
*Attorney, Agent, or Firm*—Spellman, Joel & Pelton

[57] ABSTRACT

A machine with a central strut, which strut has a center portion first and second end portion, two pairs of flexible bows, each pair comprised of two bows under flexed stress and having first and second ends. The bows are flexed in an arc such that said first and second ends of the bows extend at 90° angles to each other. The first end of each the bows in a pair are fastened to each other in overlapping longitudinal relationship to form a handle for said machine, and the second end of each of said bows are rotatably secured to an end portion of the strut in a manner to prevent lateral or longitudinal movement.

The machine converts forces applied in a direction perpendicularly to a plane to a force acting perpendicularly to the same plane but in a direction opposite that of the first force applied. The first force may be applied in the first direction of a single point, or a pair of points, in equal or differing magnitudes.

The force applied is converted to act in the opposite direction relative to the plane, and may act through one point, or a pair of points in equal or differing magnitude, or through a third point.

A slow steady motion in the direction of the first force may be utilized to obtain an extremely strong "snap-action" in the opposite direction in a further embodiment.

In an alternate embodiment, the central strut is articulated at its mid-point.

4 Claims, 6 Drawing Figures

FORCE CONVERTER

BACKGROUND OF THE INVENTION

1. Field of the Invention

This invention is concerned with a simple machine which is capable of converting force applied in one direction perpendicularly relative to a plane to a force directed in the opposite direction perpendicularly relative to the same plane.

The force conversion may be accomplished by application of the force in the first direction at a single point, or a pair of points, in equal or differing magnitudes.

The force applied is converted to act in the opposite direction relative to the plane, and may act through one point, or a pair of points in equal or differing magnitude, or through a third point.

Mechanical advantages of extremely large magnitude are easily obtained using certain embodiments of the invention.

A slow steady motion in one direction may be utilized to obtain an extremely strong "snap-action" in the opposite direction in a further embodiment of the invention.

2. Prior Art

No device is known which incorporates the same principles of operation as the machine of the present invention. The devices which seem most nearly related to the machine of the present invention are the lever and the bow are arrow.

SUMMARY OF THE INVENTION

As indicated, the present invention comprises a machine for converting forces applied in a direction perpendicularly to a plane to a force acting perpendicularly to the same plane but in a direction opposite that of the first force applied. The first force may be applied in the first direction at a single point, or a pair of points, in equal or differing magnitudes.

The force applied is converted to act in the opposite direction relative to the plane, and may act through one point, or a pair of points in equal or differing magnitude, or through a third point.

A slow steady motion in the direction of the first force may be utilized to obtain an extremely strong "snap-action" in the opposite direction in a further embodiment.

The machine of the invention comprises a central longitudinal strut which is constructed so as to be flexible in most embodiments.

In an alternate embodiment the central strut is articulated at its mid-point.

A pair of flexed bows or poles are secured to each end portion of the strut by means assuring that they are fixed thereto longitudinally and laterally to prevent lateral and longitudinal movement but are free to rotate about an axis that is concentric with the longitudinal axis of the strut, or generally parallel thereto and closely adjacent thereto. In one embodiment the ends of the bows are prevented from rotating also.

Each flexed bow extends from a respective end of the central strut towards the center of the central strut but is flexed outwardly away from the central strut and ultimately the ends thereof extend right angles to the central strut and at 90° angles to each other. The extended portions are fixedly secured to each other in side-by-side relationship to form a pair of flexed bows under flexed stress normally lying in the same plane.

Visually, the apparatus when viewed from above the plane in which the bows normally lie appears as a four-cusp hypocycloid with the central strut forming one axis thereof.

The extended end portion of each pair of flexed bows at the section where they are fixedly joined together in overlapping longitudinal relationship forms handles through which force may be applied for operation of the machine.

The force is normally applied in a direction perpendicular to the plane in which the two pair of flexed bows normally lie.

In one embodiment, the machine is secured in position at the center of the central strut with the ends of the strut free to move perpendicularly to the normal plane of the pairs of flexed bows. A force applied perpendicularly to the extended end portions of the bow pairs then causes the extended ends of the strut to move perpendicularly away from the normal plane of the bows in the opposite direction of the forces applied.

In an alternate embodiment of a method of using the machine, the ends of the bows are joined to the end portions of the central sturt and are secured against rotation about their axis. In this embodiment the result when sufficient force is applied to the handles is a "snap-action" bowing the central strut suddenly with enormous force.

In a further embodiment, the central strut of the machine is hinged or articulated at its center with the halves thereof constructed rigidly rather than flexibly, so that by connecting to the center of the strut the machine can readily be used for applicaton to work.

Variations in the construction of the machine of this invention will be apparent to those skilled in the art and especially from the detailed description of specific embodiments below.

BRIEF DESCRIPTION OF THE DRAWING

In the accompanying drawing which forms a part of the specification.

DESCRIPTION OF PREFERRED EMBODIMENTS

Figure 1:
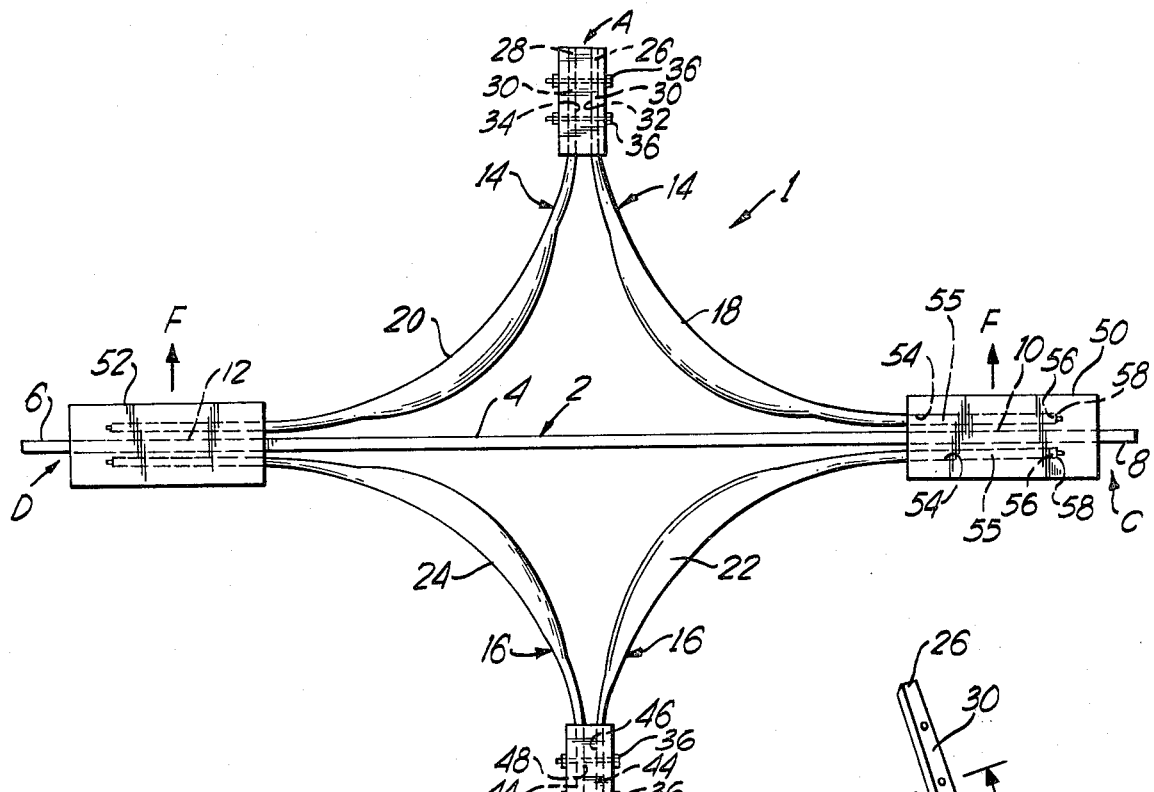
FIG. 1 is a plan view of the machine of the invention.

Referring to FIG. 1 of the accompanying drawing the machine 1 is comprised of a central strut 2 having a center portion 4 and normally extending in a straight line to ends 6 and 8 respectively.

Secured to end portions 10 and 12 respectively of the strut 2 are two pairs of flexible bows, one pair indicated by the numeral 14 and the other pair indicated by the numeral 16.

The pair 14 is comprised of the flexed bows 18 and 20 and the pair 16 by the flexed bows 22 and 24 respectively.

The outer ends 26 and 28 of the bows 18 and 20 are preferably of rectangular cross-section and secured together along a portion 30 of their opposing faces 32 and 34 by fasteners 36 such as nuts and bolts, however, any suitable fastnener means may be used.

The outer ends 38 and 40 of the bows 22 and 24 respectively are of similar structure and secured together along the portion 44 of their opposing faces 46 and 48 by additional fasteners 36.

The outer portions of the pairs of bows form operative handles for the machine of the invention and for ease of description are denominated A and B as shown in FIG. 1.

A pair of sleeves 50 and 52 respectively are longitudinally fixed to the strut 2 at the end portions 10 and 12 by conventional means not shown.

In the embodiment of FIG. 1 the ends of the bows 18 and 22 are rotatably secured in bearing 54 of the sleeve 50 and prevented from moving longitudinally by the thrust bearing 56 acting on the shoulder 58 at the end of each bow. A similar construction in sleeve 52 secures bows 20 and 24 to the end portion 12 of the strut 2. For convenience, the end areas are denominated C and D in FIG. 1.

In general, the bows 18, 20, 22 and 24 and the strut 2 are made of laminated or wound fiberglass construction. The sleeves 50 and 52 may be fiberglass also or any suitable material with requisite strength.

In operation, referring to the illustration of the machine in FIG. 1, if one anchors the device at the center of strut 2, and simultaneously pushes down at points A and B, that is into the surface of the paper, the result is that bows 18 and 24 and 20 and 22 will rotate in opposite directions within their respective sleeves 50 and 52 and cause a change in the direction of their thrust so as to make the ends C and D bow upwardly arching away from the paper and arching the member 2 concavely relative to the viewer. Conversely, if one pulls upwardly at points A and B, the ends C and D are bowed downward, bowing member 2 convexly relative to the viewer.

When point A and B are moved separately several different movements at ends C and D are possible, for example: if point A is kept stationary while point B is moved up or down the motions produced at ends C and D will be toward F as well as up or down. In effect, the mechanical advantage obtained in these actions is at least 4:1. This is as a result of combining the leverage from the length of members 18, 20, 22 and 24 with the thrust forces generated by their rotation in the described positions.

Figure 4:
FIG. 4 is a sectional view along lines 4—4 of FIG. 3.
Figure 5:
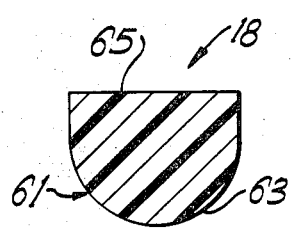
FIG. 5 is a sectional view along lines 5—5 of FIG. 3.
Figure 3:
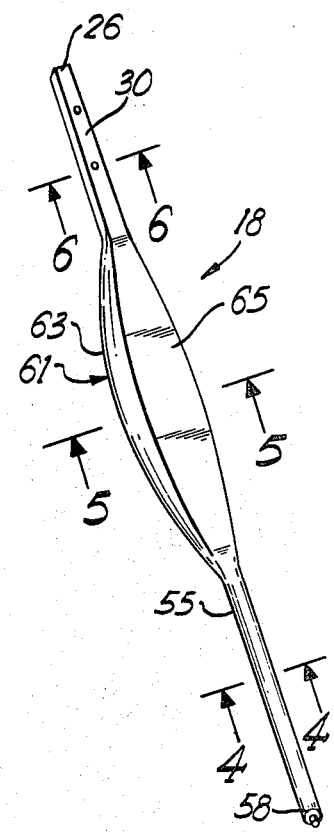
FIG. 3 is a perspective view illustrating the cross-sectional shapes of different sections of a bow member of the machine of FIG. 1.

The bows 18, 20, 22 and 24 as mentioned are preferably made of laminated wound fiberglass construction. As shown in FIGS. 3 and 4, the end of the bow 18 which is secured in the sleeve 52 is circular in cross-section along that portion indicated by 55 which is retained within the sleeve and is provided with the shoulder 58 to bear against the bearing 56 in the sleeve 52. The center portion 61 of the bow 18 is rounded in cross-section as shown in FIGS. 3 and 5 along the outer center surface 63 and flat as shown along the interior surface 65 of its arch to increase the tension.

Figure 6:
FIG. 6 is a sectional view along lines 6—6 of FIG. 3.

AS is shown in FIGS. 3 and 6, the outer end of the bow 18 which is fastened at A to bow 20 is of rectangular cross-section and may have holes therein for securing to bow 20 by means of bolts. The other bows are of the same construction.

In the foregoing embodiment, the bows 18-24 as mentioned are rotatably mounted in the sleeves 50 and 52. If desired, they may be non-rotatably secured in the sleeves. In such an embodiment, when handles A and B are moved, large twisting forces accumulate in the bows and a "snap-action" forces the center portion 4 of the sturt 2 to suddenly and rapidly bow out with amazing force.

Figure 2:
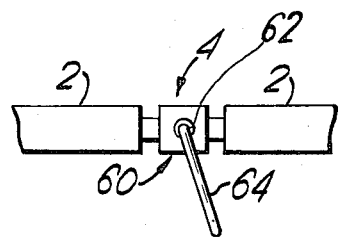
FIG. 2 is a plan view of a portion of the machine of FIG. 1 incorporating an alternate embodiment.

Referring to FIG. 2, there is shown an alternate embodiment of the invention relating to the construction of the central strut 2.

FIG. 2 shows the center portion 4 of the strut 2. In this embodiment, the strut is hinged at 60 and provided with a fastener 62 for securing a tool hub or the like to the strut 2 to transfer force to do work. In this embodiment, when A and B are moved downwardly for instance, strut 2 does not "bow" and absorb the force but fastener 62 is moved and work may be accomplished by connection to a tool indicated schematically at 64.

There has been described a simple new machine. It may be constructed readily by those skilled in the art from known materials using common assembly processes apparent to those skilled in the art.

While the invention has been described with respect to a preferred embodiment, it should be apparent to those skilled in the art that numerous modifications may be made thereto without departing from the spirit and scope of the invention.

What I claim is:

1. A machine comprising a central strut, a center portion of said strut, and first and second end portions of said strut, two pairs of flexible bows, each of said pairs comprised of two bows under flexed stress and each of said bows having first and second ends, each of said bows flexed in an arc such that said first and second ends of said bows extend at 90° angles to each other, the first end of each of said bows in a pair being fastened to each other in overlapping longitudinal relationship to form a handle for said machine, and said second end of one bow in each of said pair of bows being rotatably secured to said first end portion of said strut in a manner to prevent lateral and longitudinal movement, and said second end of the other bow in each of said pair of bows being rotatably secured to said second end portion of said strut in a manner to prevent lateral and longitudinal movement.

2. A machine as claimed in claim 1 wherein said strut is articulated at its center.

3. A machine as claimed in claim 1 wherein said strut and bows are comprised of laminated fiberglass.

4. A machine as claimed in claim 1 wherein a movement of the paired first ends of said bows in one direction relative to the plane of said strut causes a movement of the paired second ends in the opposite direction.

* * * * *